Patented Dec. 19, 1922.

1,439,286

UNITED STATES PATENT OFFICE.

MILTON F. BEECHER, OF WORCESTER, MASSACHUSETTS, ASSIGNOR TO NORTON COMPANY, OF WORCESTER, MASSACHUSETTS, A CORPORATION OF MASSACHUSETTS.

BONDED ALUMINA REFRACTORIES.

No Drawing. Application filed April 6, 1921, Serial No. 459,181. Renewed May 5, 1922. Serial No. 558,774.

*To all whom it may concern:*

Be it known that I, MILTON F. BEECHER, a citizen of the United States of America, residing at Worcester, in the county of Worcester and State of Massachusetts, have invented certain new and useful Improvements in Bonded Alumina Refractories, of which the following is a full, clear, and exact specification.

My invention relates to refractories and more particularly to refractory articles consisting essentially of ceramic bonded crystalline alumina granules.

It has been proposed to utilize fused alumina for heavy refractories by incorporating such granules in a regular fire clay mixture in place of part or all of the fire clay grog. For instance, mixtures of this character have been made containing all the way from 10 to 30% of fused alumina, the following being a specific example:

Fire clay _____ 37.5%
Fused alumina grains, 150 mesh_____ 27.5%
Fire clay grog_____ 35%

The bricks of this type have exhibited greater mechanical strength than the regular clay fire brick when tested at room temperatures but have shown only a slightly greater resistance to deformation under load at high temperatures. They have not proven satisfactory, since they were more readily cracked or spalled by repeated temperature changes than the clay fire brick.

The grains of fused alumina are very dense and their surfaces are smooth as compared with other non-plastics in common use. This property makes it difficult to secure a good bond between the clay and the fused alumina. The latter, because of its density and refractoriness, is practically inert when heated in contact with a highly refractory clay to a temperature such as is ordinarily employed in the firing of refractories so that unless the clay possesses the ability to take some of the fused alumina into solution the bond will be almost entirely one of adhesion and so be comparatively weak. The weakness would be apparent when hot, during cooling, and when cold.

By using a clay which contains a proper amount of fluxes, a solution of alumina will occur at the point of contact with the alumina granules and the bond will be strengthened accordingly since a gradual gradation from alumina to clay occurs at the parting, and the bond between the two is one of cohesion—the latter being comparatively great either in fused alumina or burned clay. Hence, refractory articles comprising fused alumina bonded by vitrified ceramic materials have been made of compositions containing from 5% to 15% of a plastic vitrifiable clay and 95% to 85% of fused alumina grains. These grains have always been present either as graded or ungraded sizes which are relatively fine, i. e., such grains as will pass through a sieve of 90 meshes to the linear inch, and such refractories have been burned at about Seger cone 12. Such compositions have been well suited for small laboratory ware and refractory articles in general having thin walls and small cross sections, but they have not been suitable for bricks and heavy shapes, since they crack readily under subsequent temperature changes, and since difficulty arises in the drying and firing operations due to excessive shrinkage of the articles.

Crystalline alumina as utilized in this art contains various impurities, of which silica, titania and iron oxide are the main ingredients. These impurities concentrate in the fine sizes when the fused alumina ore is crushed. Moreover, these fine sizes contain ferrosilicon and pick up extraneous matter in the milling operation, such as wood, iron, sand, dirt and so forth, and these, in addition to the impurities inherent in the grain itself, form slags which have a considerable detrimental or modifying effect upon the properties of the refractory article.

These ceramic bonded refractory articles have heretofore been fired at approximately cone 12, which is a sufficiently high temperature to vitrify the bond and produce a mechanically strong body under that heat treatment. However, such clay materials as have been used increase in volume by overfiring when heated at higher temperatures so that if a refractory brick made up under these conditions is built into a wall structure or used as a muffle, the article will expand when subjected to a temperature higher than that at which the material was burned, with the consequent danger of breakage or deformation of the refractory.

It is accordingly an object of my invention to overcome the difficulties heretofore experienced in making large refractory articles and to provide a satisfactory refractory made of ceramic bonded crystalline alumina which will withstand high temperatures without material cracking, which will have high mechanical strength and resistance to deformation under load, which will be resistant to spalling and which will not be subject to further volume changes when placed in use.

In accordance with this invention, I have discovered that fused alumina fire brick or large sized refractory shapes of superior quality may be formed by making the plastic mixture of such grain sizes and composition that the article during drying and firing will not shrink to any material extent and by employing such a bond and firing it at such a heat treatment that any increase in volume incident to heating will be substantially completed during the firing operation. Furthermore, by utilizing large grain sizes I obtain the purer materials which will have little permanent expansion upon heating, and I employ an amount of bond which will permit the completely preshrunk crystalline alumina granules to be substantially in contact throughout the whole body of the article, so that the bonded refractory article cannot shrink further to any material extent. In order to keep the clay content down to a desired minimum amount which is consistent with a mechanically strong bonding action and volume permanency, I utilize such a combination of assorted sizes of alumina grains as to minimize the voids in the refractory article. If the grains were not in contact, then the grains would be floated in the large amount of soft fused clay and the softening point of the brick would be practically that of the clay itself, whereas by having the granules in contact, this serious disadvantage is avoided. By filling the voids as much as is feasible with crystalline alumina instead of clay, I make it unnecessary to have any large amount of clay present and ordinarily not over 15% by weight.

As a further feature of my invention, I propose to fire the bonded article at a considerably higher temperature than its normal vitrifying point until the desired viscosity of bond has been obtained and substantially all volume change due to swelling of the clay and expansion of the alumina grains has been completed. By this procedure, I insure a greater bond strength or bond adhesion to the grain and a better reaction between the clay and alumina than heretofore obtained, and the formation of a considerable amount of sillimanite. In other words, it is necessary to obtain a lower viscosity of the clay bond than that which is attained at the normal vitrifying temperature but without going over to the completely fused or glassy condition, in order that an appreciable reaction with the alumina grains may be accomplished in the firing operation and no detrimental permanent volume increase can take place in after use of the article. Any further heat treatment of the article at a higher temperature in subsequent use will merely result in the formation of further sillimanite until the silica in the slag in the alumina granules and in the clay has been combined with alumina. It is to be particularly noted that if fine grain sizes are used as heretofore practiced, the permanent volume change is not completed during the firing operation because of the large amount of impurities and extraneous materials present. Hence, the normal firing heretofore employed has never fully completed the volume change, which would require an abnormally long period, totally impracticable in the commercial manufacture of these articles, so that changes in the article have continued during subsequent commercial use.

In order to insure having the alumina granules in substantial contact and the article as dense as possible, the theoretically exact condition would be one in which I employ such grain sizes and amounts of grain that the larger grain sizes will be in contact and the particles of the next smaller size will fit in the voids between the largest particles. The voids between these will in turn be filled by the still finer particles, and so on, depending upon the number of different sizes of particles employed. It of course is clear that this theoretically exact condition is not exactly fulfilled but is merely approximated within the feasible limits of expansion of the article. I ordinarily utilize grits of 46 mesh or larger for the coarsest size. If, for example, a grit of #14 mesh is the coarsest chosen, I may use three grit sizes proportioned as follows to give a dense article incapable of shrinking to any material extent:

\# 14 grit _____50% by weight.
\# 46 grit _____30# by weight.
\#150 grit _____20% by weight.

In this way I am enabled to utilize crystalline alumina granules of large size and obtain an article made up almost wholly of such super-refractory material.

In order to provide a satisfactory bond for this material, I employ a plastic, workable bond of the ball clay type which is of a dense burning variety having a high bonding strength. The composition of one satisfactory ball clay, known as Mississippi ball clay, may be given as follows:

| | |
|---|---|
| $Al_2O_3$ | 23.07% |
| $SiO_2$ | 59.16% |
| $Fe_2O_3$ | 3.7% |
| $TiO_2$ | 3.09% |
| CaO | 0.48% |
| MgO | 1.44% |
| Alkalis | Trace |
| Loss on ignition | 9.02% |

Such a clay shows a tensible strength of 137 pounds per square inch in the dry state when used in a mixture containing 75% of #60 mesh granular non-plastic material. When fired at the temperatures employed it will react considerably with the fused alumina granules, which condition, it is to be noted, is not present in the case of the fire brick referred to above, since such fire brick clay is of very open burning character and holds the refractory granules only mechanically and not because of vitrification of the bond.

As a specific example illustrating my invention, a refractory brick may be made in the following manner: A fair quality of bauxite containing the usual impurities is fused in the electric furnace and cooled to a crystalline condition, after which it is broken up and crushed to proper grain sizes. Of this fused alumina I select 50 parts by weight of those grains which will just pass through a screen of 14 meshes to the linear inch, 30 parts of #46 mesh and 20 parts of 150 mesh. To this material is added 15 parts by weight of Mississippi ball clay in a dry pulverized condition. This is thoroughly dry mixed and then enough water added to make the mass suitable for pressing or tamping in steel or wooden molds. This will require from 1 to 3% of water. A small amount of dextrine or other organic binder may be added to give additional strength to the mass while in the unburned condition. A brick or other suitable shape is then formed by firmly tamping the material into a mold of the required shape or by pressing it in a screw or hydraulic press. After molding, the shape is dried under suitable temperature and humidity conditions. It is then fired in a ceramic kiln, in accordance with the practice well known to those skilled in this art, at a temperature corresponding to the softening point of Seger cone 16 or higher. At this temperature the ball clay, which is of such a character that it will vitrify to form a mechanically strong body at cone 12, will have reached that degree of fluidity which will give the desired extent of reaction with the alumina and its slag to produce a strong bond. As a result, the bond will be in that condition which is known as overfired and there will be substantially no further volume increase for any subsequent rise in temperature. As is well known in this art, the firing operation will be conducted through a considerable period of time, the temperature being raised gradually, and cooling being carried on equally slowly, this operation consuming at least 100 hours in the ordinary case.

In accordance with this invention, I have produced a refractory brick consisting mainly of crystalline alumina bonded together by a small amount of vitrified bond which is present in the interstices or pores between the grains which, for the specific example given above, will have a modulus of rupture in cross breaking of over 800 pounds per square inch for the brick in the cold condition. In a standard load test 1350° C., using a load of 50 pounds per square inch, there is no measurable deformation, and in a spalling test it is very much superior to the former types of refractories containing fused alumina.

Having thus described my invention, what I claim as new and desire to secure by Letters Patent is:

1. A refractory article comprising crystalline alumina grains containing slag and oxidation impurities integrally united by a vitrified ball clay material in which the grains are substantially in contact and shrinkage during drying and firing of the article is minimized, said article having been fired above cone 12 and the normal vitrifying temperature of the bond until any permanent volume change due to expansion in the grains or the bond has been substantially completed 2. A refractory article comprising crystalline alumina grains of assorted sizes, the largest being coarser than 46 mesh and the other sizes being so proportioned as to form a dense body with the grains substantially in contact with one another, which is incapable of shrinking during the drying and firing operations, said grains being bonded by a vitrified clay, comprising not over 15% by weight of the total mass, which has been fired above its normal vitrifying temperature until any permanent volume change due to expansion of the bond has been substantially completed.

3. A refractory article comprising crystalline alumina grains of assorted sizes bonded by vitrified clay material, said grains comprising coarse particles, which make up 50% of the total volume of the article, interspersed with other grain sizes which provide a dense structure incapable of shrinking during the drying and firing operations, said clay bond comprising not over 15% by weight of the total mass and being present mainly in the interstices between the grains.

4. A refractory article comprising crystalline grains consisting primarily of alumina bonded together with a vitrified, non-glassy bond of the ball clay type which is capable of developing to a strong body at cone 12, said bond comprising not over 15% by weight of the total mass of the article and having been heat treated above cone 12 until overfiring is evident and any permanent expansion in the article has been substantially completed, and said grains being present in such sizes and amounts as to form a dense mass of low porosity which has substantially no shrinkage during drying and firing of the article.

5. A refractory article comprising crystalline alumina grains containing slag and oxidation impurities integrally united by a vitrified ball clay material which is vitrifiable at cone 12, said grains forming at least 85% of the mass and comprising particles coarser than 46 mesh, which make up at least 50% of the total volume, interspersed with other granules sized and proportioned to render the mass dense and incapable of shrinking during the drying and firing operations, the mass having been fired above cone 12 until any permanent volume change due to expansion in the grains or the bond has been substantially completed.

Signed at Worcester, Massachusetts, this 5th day of April, 1921.

MILTON F. BEECHER.

Witness:
HAROLD R. SAVAGE.